Dec. 1, 1953  H. SCHICHT  2,660,839
TOOTH FACE GRINDER
Filed April 11, 1951  2 Sheets-Sheet 1
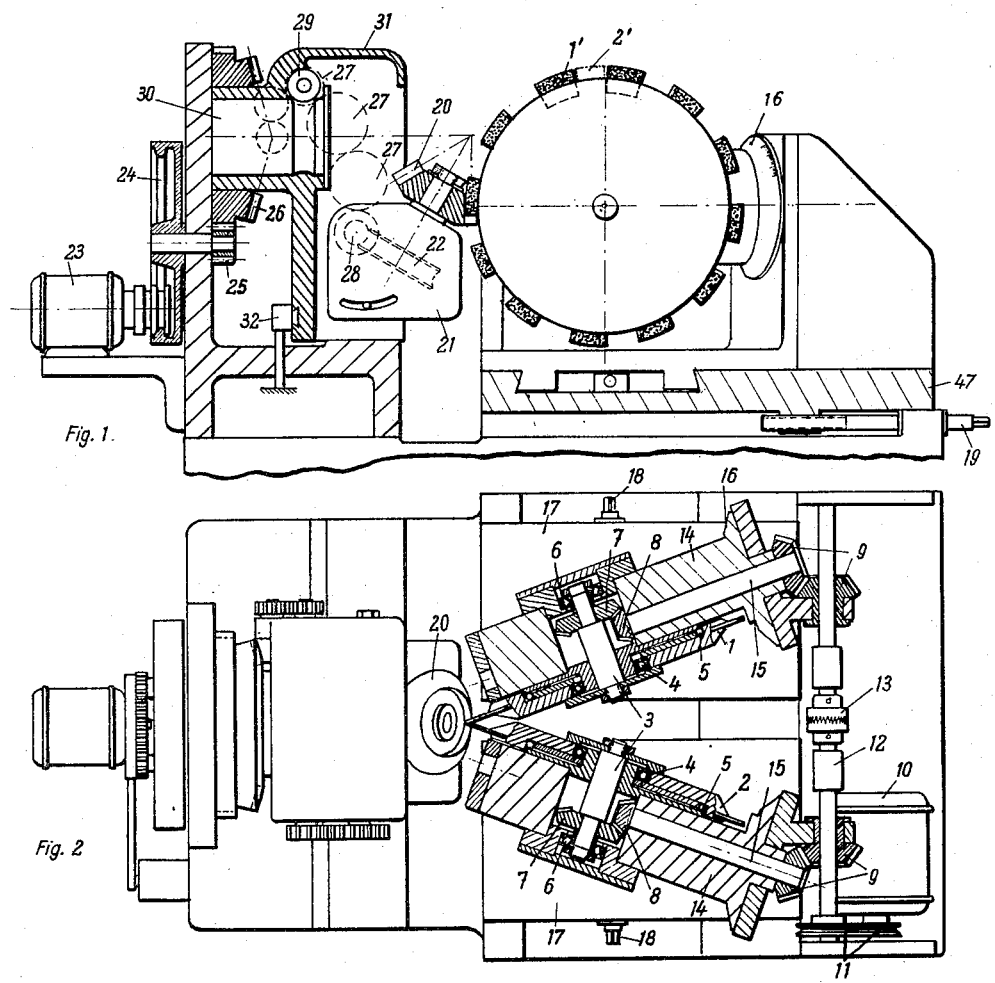
Inventor:
Heinrich Schicht
by George Lynn DeMott
atty Dec. 1, 1953  H. SCHICHT  2,660,839
TOOTH FACE GRINDER
Filed April 11, 1951  2 Sheets-Sheet 2
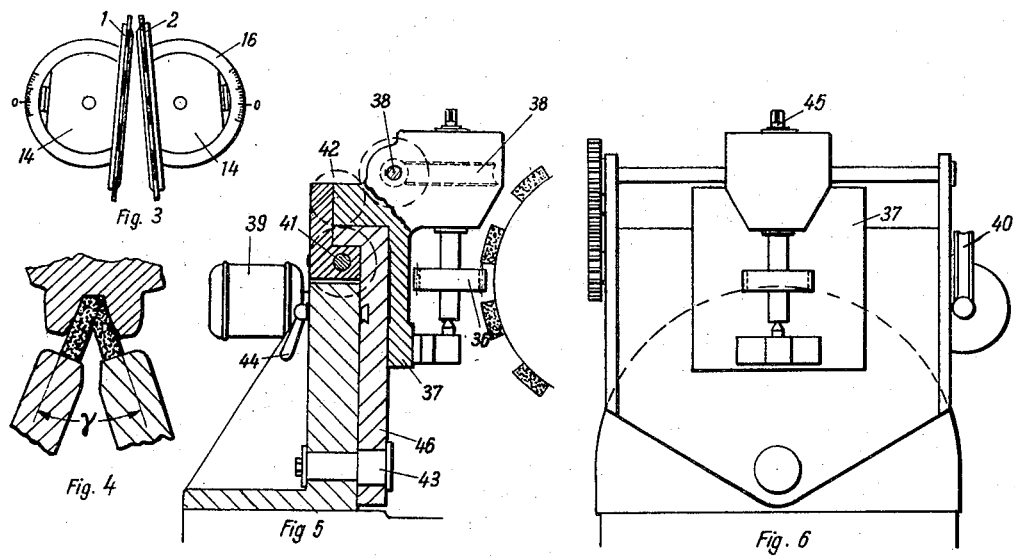
Inventor:
Heinrich Schicht
by George Lynn DeMatt
atty Patented Dec. 1, 1953

2,660,839

UNITED STATES PATENT OFFICE 2,660,839

TOOTH FACE GRINDER

Heinrich Schicht, Huckeswagen, Germany, assignor to W. Ferd. Klingelnberg Sohne, Remischeid-Berghausen, Germany Application April 11, 1951, Serial No. 220,377

Claims priority, application Switzerland April 20, 1950

6 Claims. (Cl. 51—124)

This invention relates to grinding machines and more particularly to tooth face grinders for gear teeth. While the invention will be described principally as producing finishing cuts on gear teeth already formed, it will also be indicated how the invention is also applicable to the original forming of the teeth.

Grinding machines, according to this invention, differ from the conventional types of tooth face grinders essentially in being equipped with two tools, fitted with grinding segments, and arranged at an angle relative to each other. This angle is equivalent to the angle defined by the tooth faces of the work piece to be machined and meshing in such a way that the grinding surfaces of the segments of the one tool, machine the right-hand tooth faces, and the segments of the other tool, machine the left-hand tooth faces. The meshing of the segments is rendered possible by spacing the segments at intervals greater than the segment width.

The dual tool arrangement, and the angular position of the tools relative to each other, have the great advantage that the grinding faces of the segments produce excellent tooth face lines over the whole length of the teeth to be machined, without it being necessary to effect any longitudinal feed motion. With other conventional grinding wheels this result can only be obtained by employing a feed motion, in which case, the tooth face lines are composed of the addendum envelopes of the individual feed positions.

The rolling motion is preferably performed by the work piece instead of by the tools, so as to enable the diameter of the tools to be made fairly large without encountering constructional difficulties. In this way, it is possible to further take advantage of the absence of a longitudinal feed motion. Machining times are thus considerably reduced, while the machine itself is of the utmost simplicity in design.

The objects of the invention are, therefore, to provide a grinding machine capable of use either for face grinding or for hobbing; to provide a tooth face grinder in which accurate tooth face grinding can be accomplished without any longitudinal feed motion; to provide a structure in which two tooth faces are ground simultaneously, and to provide a structure in which a rolling motion can be imparted to the work, instead of to the tool, so as to permit use of a large diameter tool.

Numerous other objects and advantages will appear from the description when it is read in conjunction with the drawings in which:

Figure 1 is a section through one embodiment of the invention, as employed in a rolling type grinder for machining bevel gears.

Fig. 2 is a plan view of the grinder shown in Fig. 1.

Fig. 3 is a front detailed view of the obliquely meshing tools employed in accordance with the invention.

Fig. 4 is a fragmentary horizontal section of the meshing tools, and the work of Fig. 1.

Fig. 5 is a vertical sectional view of apparatus for cutting spur and spiral gears on the machine shown in Figs. 1 and 2; and Fig. 6 is a side view of the apparatus shown in Fig. 5.

The invention will be more clearly understood upon reference to Figs. 1 and 2 wherein reference characters 1 and 2 represent two obliquely meshing tools having grinding segments 1' and 2', respectively. Each tool has a shaft 3 supported in radial bearings 4.

Annular ball races 5 ensure straight running of the tools and a third bearing 6 serves to set this ball race in a position without play in relation to a radial bearing 4. As it appears from Fig. 2, the diameter of the annular ball race is greater than the axial distance of this race from bearing 6. The shafts of the tools are fitted with bevel gears 7 driven by pinions 8. The latter are in turn driven by an electric motor 10 through means such as a V-belt drive 11, countershaft 12 and bevel gear sets 9. The countershaft 12 is divided in the centre, its two sections being connected by means of the toothed coupling 13. The latter enables the two mating grinding tools to be brought into proper meshing position relative to each other, so that the grinding segments of one tool can mesh with the gaps of the other tool.

The supporting body 14 of the grinding tools is arranged in such a way that it can be rotated about shaft 15 of driving pinion 8. The relative position of the supporting body can be read from a graduated dial on the collar 16. This adjusting arrangement permits the grinding tools to be adapted to the longitudinal direction of the gear teeth to be machined. The principal path covered by the grinding segments, for instance, must be directed towards the tip of the bevel gear cone. This adjustment is shown in Fig. 3.

The bearing bodies 14 are inclined relative to each other in such a way that the generating lines of the grinding segments correspond in their angular position (γ in Fig. 4) to the face angle of the gear to be machined, and this angular position can be adjusted as required.

The two bearing bodies rest on slides 17 and can be adjusted relative to each other by means of adjusting screws 18 in such a way as to ensure that the gashes are precisely machined to the width provided. The slides 17 are in turn arranged on a transverse plate 47 which in conjunction with the central screw 19 permits a feed motion in the direction of the tooth height. The feed arrangement as depicted herein by way of example only, is of the hand-operated type, but in practice it will be replaced by an automatic feed system serving the purpose of reducing the distance covered by the rolling motion, and of advancing the tool by the so-called plunging process to the desired tooth depth.

As outlined above, this grinding machine works according to a rolling process in which the grinding surfaces are limited by straight lines. If these surfaces are in one plane, the machined gears provide contact on their whole tooth surface. It is also possible without difficulty to arrange the grinding surface on a concave cone so that it forms a convex area of tooth contact.

The machine illustrated offers a great advantage in that it can be alternatively used for the cutting of different kinds of gears, such as bevel gears, spur gears, spiral gears and even worms, by substituting another tool head. Figs. 1 and 2 show the machine equipped with a tool head to cut bevel gears, while Figs. 5 and 6 represent a machine with an attachment for cutting spur and spiral gears.

In Figs. 1 and 2 the bevel gear 20 to be subjected to a grinding operation is carried by the work holder 21 which can be swung into the cone angle formed by the bevel gear, and is rotated by dividing worm wheel 22. The latter is driven by motor 23 through transmission 24, 25 and 26, gears 27 and worm 28. The shaft of one of the gears 27 is fitted with worm 29 which engages the toothed circumference of a stationary shaft 30 on which the whole generating head is supported in a way that it can be rotated. One of the gears 27 is equipped with a dividing clutch which serves for dividing the gear to be ground in a known manner. The gears are interchangeable so as to permit their number of teeth to be adapted to the number of teeth on the gear to be ground.

When motor 23 is started, it drives the gear to be ground through gear train 24 to 28. At the same time the generating head 31 performs a partial revolution around the shaft 30. Since the axis of this shaft intersects the cone point of the gear to be ground, the two movements in combination result in the rolling movement as, for instance, in the case of the generating bevel gear planing machine. When the rolling cycle has been completed, the direction of rotation is reversed by a change-over device 32. In this way each tooth goes through the sequence of rolling movements.

The work holder described with reference to Figs. 1 and 2 serves for the production of bevel gears with intersecting axes. If axially offset bevel gears are to be produced, then a work holder is employed which permits machining in the axially offset position of the one work piece.

The work holder for the cutting of spur and spiral gears according to Figs. 5 and 6 differs in construction from the described work holder head for bevel gears as follows:

The spur gear 36 to be cut is supported in the work holder with its axis in vertical position and is rotated by the dividing worm gear 38. This dividing worm gear 38 is driven by motor 39 through worm drive 40, screw 41 and change speed gears 42. Spindle 41 drives a nut which shifts the work holder 37. Slide way 46, on which the work holder 37 moves, can be rotated about pivot 43 and secured by means of handle 44. This arrangement enables the work to be brought into the proper angular position if helical teeth are to be cut. The slight variation in height resulting from the rotation of slide way 46, necessary to move the work into the required angular position, can be easily compensated for by turning adjusting screw 45. Also in this arrangement, one of the change gears 42 is connected with a dividing mechanism.

The mode of operation of the rolling system is essentially the same as that described above.

The machine is represented in the drawing as fitted with grinding segments 1', 2', but these can be replaced by cutting teeth which must also mesh obliquely relative to each other, as described above in connection with the grinding segments. Thus it is possible to employ the machine for either grinding or cutting and the invention is not limited to either. Consequently, it is intended that the terminology used be construed broadly as covering either arrangement.

Having thus described the invention, what is claimed is:

1. In a gear machining apparatus, a grinding unit comprising a pair of circular tool carriers disposed at an angle corresponding to the angle defined by the tooth face lines of the work piece to be machined, each of said tools being provided with three bearings comprising an annular one to ensure straight running of the tool, a radial one to ensure concentric running, and a third one to position the annular bearing in fixed relation to the radial one, the diameter of the annular bearing exceeding the axial distance between said annular bearing and the third bearing.

2. In a gear generating apparatus of the type employing rotating tools and wherein the rolling movement is performed by the work piece, the combination with a tool carrier of two tools disposed in inclined relation to each other, the angle between said tools corresponding to the angle defined by the tooth face lines of the work piece to be machined, grinding segments carried by each of said tools, means for so mounting said segments that the segments of one tool mesh with those of the other tool on the side adjacent to the work piece, whereby the grinding segments of one tool machine the right hand face of a gash in the work piece while the other tool machines the left hand face of the gash, each tool being provided with an annular ball race to insure straight running of the tool, a radial bearing to insure true concentric running, and a third bearing to set the ball race in fixed relation to the radial bearing, the diameter of the ball race being greater than the axial distance between said race and said third bearing.

3. A gear machining apparatus comprising a work carrier, a pair of rotating tools disposed in operative association with said carrier, said tools being inclined relative to each other to form a first angle corresponding to the angle defined by the tooth face lines of the work piece to be lower than that of all films adjacent to it, the film in contact with the layer having a lower index than its adjacent film, each of said films having an optical thickness which is substantially of the order of ¼ wave length of light rays in the spectral region of about 500–600 millimicrons.

4. A reflector for light projectors comprising a semi-transparent reflecting layer of a material which transmits a substantial amount of infra-red rays and reflects a substantial amount of white light so that visible rays from a light source may be reflected onto a film gate and the infra-red rays from the source will be transmitted through the reflecting layer and thereby reduce the amount of heat at the film gate, said layer being characterized by a metallic reflection in the visible range of the spectrum, said layer being formed of a semi-transparent layer of silicon, and means on the layer for increasing the reflectivity of the layer for visible rays, said means comprising at least one pair of superposed films of material deposited on the surface of the layer which faces the light source, each of said films being formed of a different material having respectively different refractive indices, the lower index film of each pair having a refractive index lower than that of all films adjacent to it, the film in contact with the layer having a lower index than its adjacent film, each of said films having an optical thickness which is substantially of the order of ¼ wave length of light rays in the spectral region of about 500–600 millimicrons.

5. A reflector for light projectors comprising a semi-transparent reflecting layer of a material which transmits a substantial amount of infrared rays and reflects a substantial amount of white light so that visible rays from a light source may be reflected onto a film gate and the infrared rays from the source will be transmitted through the reflecting layer and thereby reduce the amount of heat at the film gate, said layer being characterized by a metallic reflection in the visible range of the spectrum, said layer being formed of a semi-transparent layer of selenium, and means on the layer for increasing the reflectivity of the layer for visible rays, said means comprising at least one pair of superposed films of material deposited on the surface of the layer which faces the light source, each of said films being formed of a different material having respectively different refractive indices, the lower index film of each pair having a refractive index lower than that of all films adjacent to it, the film in contact with the layer having a lower index than its adjacent film, each of said films having an optical thickness which is substantially of the order of ¼ wave length of light rays in the spectral region of about 500–600 millimicrons.

6. A reflector for light projectors comprising a semi-transparent reflecting layer of a material which transmits a substantial amount of infra red rays and reflects a substantial amount of white light so that visible rays from a light source may be reflected onto a film gate and the infra red rays from the source will be transmitted through the reflecting layer and thereby reduce the amount of heat at the film gate, said layer being characterized by a metallic reflection in the visible range of the spectrum, said layer being formed of a semi-transparent layer of stibnite, and means on the layer for increasing the reflectivity of the layer for visible rays, said means comprising at least one pair of superposed films of material deposited on the surface of the layer which faces the light source, each of said films being formed of a different material having respectively different refractive indices, the lower index film of each pair having a refractive index lower than that of all films adjacent to it, the film in contact with the layer having a lower index than its adjacent film, each of said films having an optical thickness which is substantially of the order of ¼ wave length of light rays in the spectral region of about 500–600 millimicrons.

7. A reflector having the structure recited in claim 3 in which the reflecting layer transmits about 1%–30% of the light rays having a wave length of about 435 millimicrons which are incident upon the layer.

8. A reflector having the structure recited in claim 3 in which the film next to the layer is formed of magnesium fluoride and the other film of the pair is formed of zinc sulphide.

9. A reflector having the structure recited in claim 3 and a rigid base for supporting the layer and films, said base being formed of a material which transmits a substantial amount of infra red rays.

10. A reflector having the structure recited in claim 2 and a rigid glass base for supporting the layer and films.

ARTHUR F. TURNER.

References Cited in the file of this patent

UNITED STATES PATENTS

| Number | Name | Date |
|---|---|---|
| 1,342,894 | Bugbee | June 8, 1920 |
| 1,425,967 | Hoffman | Aug. 15, 1922 |
| 2,379,790 | Dimmick | July 3, 1945 |
| 2,394,533 | Colbert et al. | Feb. 12, 1946 |
| 2,412,496 | Dimmick | Dec. 10, 1946 |
| 2,495,499 | Amon | Jan. 24, 1950 |
| 2,519,722 | Turner | Aug. 22, 1950 |

FOREIGN PATENTS

| Number | Country | Date |
|---|---|---|
| 716,153 | Germany | Dec. 8, 1939 |

OTHER REFERENCES

Journal of the Optical Society of America, vol. 37, No. 6. June 1947, pages 451 through 465.